July 14, 1942.  E. POIRIER  2,289,931
VALVE
Filed Jan. 11, 1940　　2 Sheets-Sheet 2
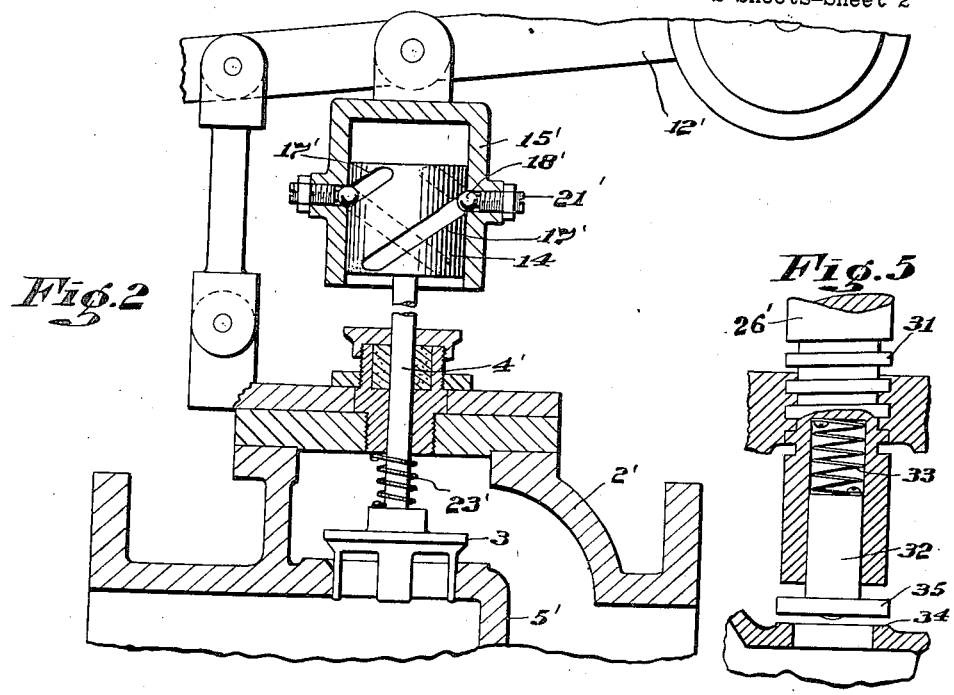
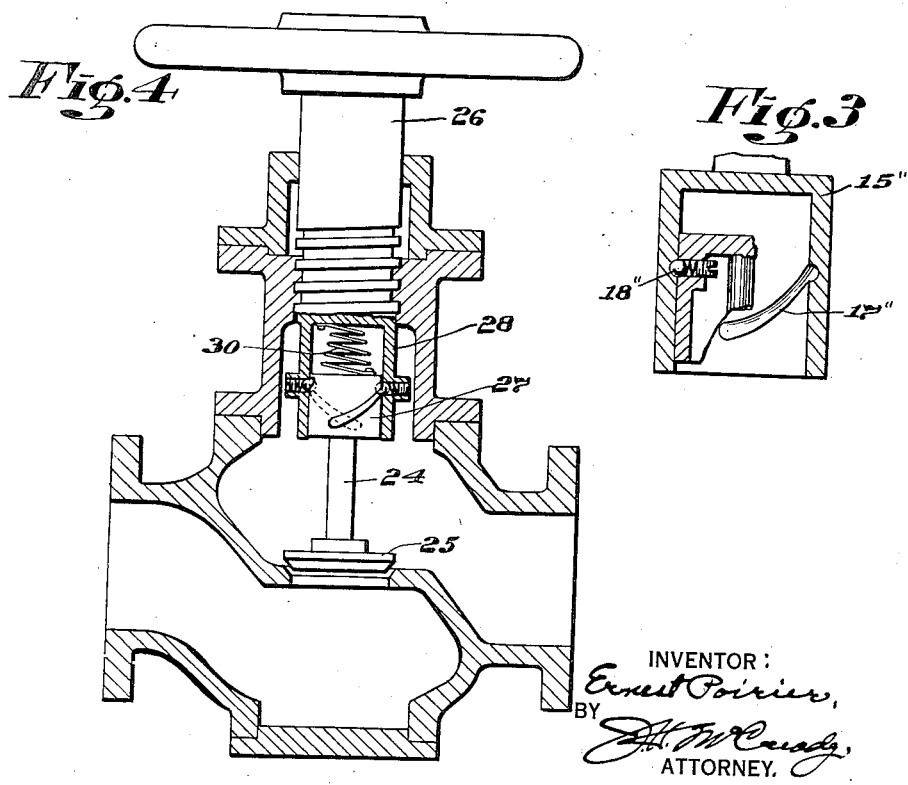
INVENTOR:
Ernest Poirier,
BY
J. H. McCrady,
ATTORNEY.

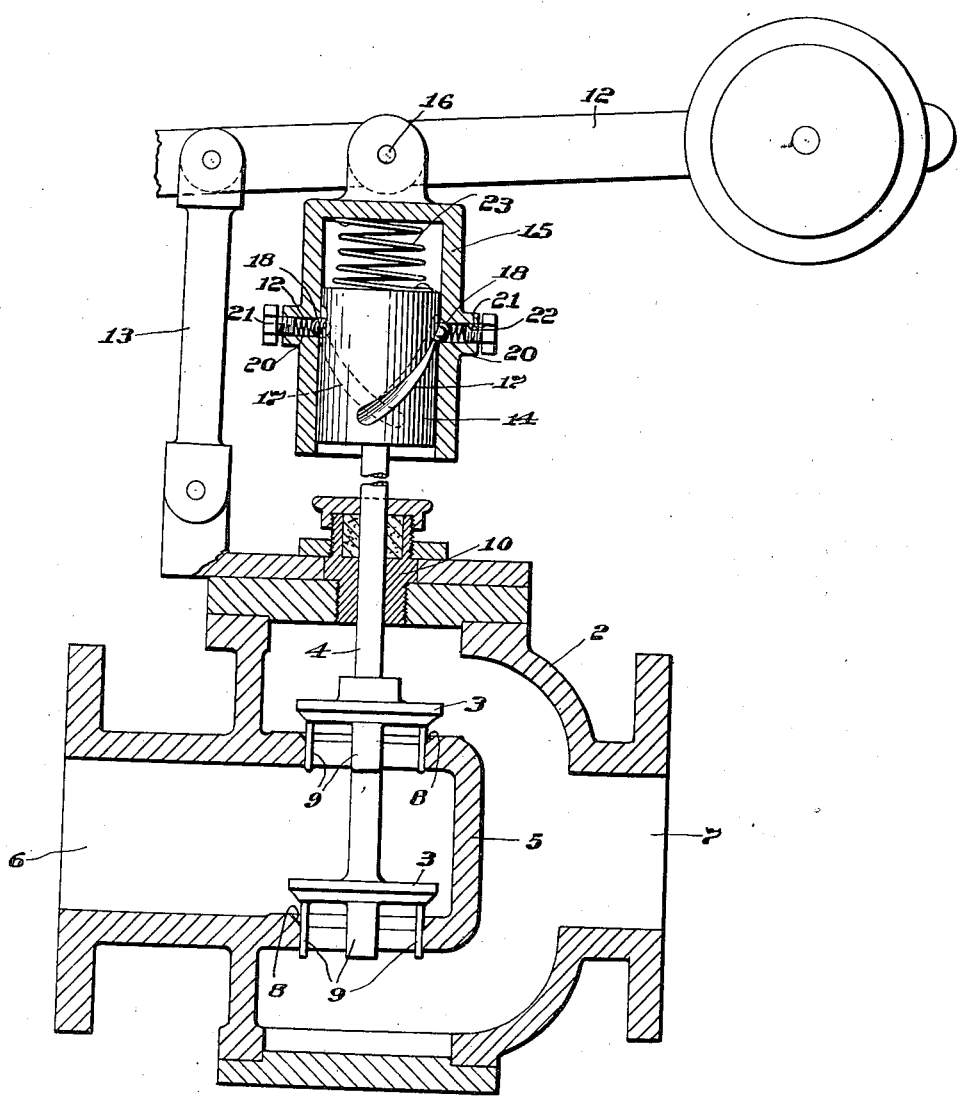

Patented July 14, 1942

2,289,931

UNITED STATES PATENT OFFICE 2,289,931

VALVE

Ernest Poirier, Waterville, Maine

Application January 11, 1940, Serial No. 313,427

11 Claims. (Cl. 251—38)

This invention relates to valves and is more especially concerned with those used in controlling the flow of liquids of such a nature as to interfere with the operation of the valve. An important example occurs in the use of valves in automatic controls for governing the flow of liquids carrying fiber, fillers, and materials of various kinds, which tend to corrode the valve seats or to accumulate on them or on the plunger in such a manner as to interfere with the operation of the valve. In such an event the mechanism for operating the valve in response to predetermined changes in conditions may fail to function, due solely to the presence of such accumulations or to the inability of the operating mechanism to close or open the valve against the resistance so imposed.

The present invention aims to overcome these difficulties.

The nature of the invention will be readily understood from the following description when read in connection with the accompanying drawings, and the novel features will be particularly pointed out in the appended claims.

In the drawings:

Figure 1 is a view, partly in side elevation and partly in vertical section, of a valve constructed in accordance with this invention;

Fig. 2 is a similar view showing a slightly different construction;

Fig. 3 is a sectional view showing a further variation;

Fig. 4 is a view similar to Fig. 2 illustrating another embodiment of the invention; and Fig. 5 is a view similar to Fig. 4 except that the cam mechanism has been omitted.

Referring first to Fig. 1, the valve structure there shown is of the balanced type and includes a valve casing 2, a plunger provided with upper and lower valve disks 3—3 and a stem 4 to which they are rigidly secured. The usual partition 5 divides the space in the valve into high pressure and low pressure chambers communicating with the inlet 6 and outlet 7, respectively, and this partition is machined in the usual manner to provide seats 8—8 for the respective valve disks 3—3. Usually, also, each disk has guiding fingers, such as those shown at 9, associated with it and projecting into the ports below the seats where they serve to steady the valve plunger and to guide it during its opening and closing movement. In the cap or bonnet of the valve a stuffing box 10 is provided for the passage therethrough of the stem 4.

So far as the construction above described is concerned, it merely illustrates one type of valve to which the invention may be applied. Also, any suitable operating element, such as the weighted lever 12 connected to the valve casing by means of a link 13, may be used to raise or lower the valve stem. According to the present invention, however, means is provided to cooperate with this element in producing a rotary movement of the valve plunger around its own axis and preferably while the disks 3—3 are in contact with their seats 8—8.

In the particular arrangement shown, the connecting means between the plunger 4 and lever 12 includes a piston or drum 14, secured fast on the upper end of the valve stem, and a sleeve or cylinder 15 in which the part 14 is freely slidable, the sleeve being pivoted to the lever 12 and 16. Formed in the peripheral surface of the piston 14 are cam grooves 17—17 of spiral form, and balls 18—18 run in these grooves, the balls being supported in radial holes 20—20 drilled in the wall of the cylinder 15 at diametrically opposite points and backed up by screws 21—21, either with or without the interposition of spiral springs, such as those shown at 22. Preferably, also, a torsion spring 23 is positioned between the upper end of the piston 14 and the lower inside surface of the cylinder, its opposite ends being secured, respectively, to these members.

Assuming that the valve is open, either partially or completely, and that the lever 12 is moved downward to close it, this movement may be transmitted directly through the cylinder 15, balls 18, and piston 14 to the valve plunger, and produce immediately a downward movement of the latter. If, however, there is considerable resistance to this movement as, for example, due to a tight packing in the stuffing box 10, or to a corroded valve stem, or a deposit of fibers on the guiding fingers 9 or on the walls of the port which they engage, then the resistance to downward movement of the plunger may be so great that the first effect will be a rotative movement of the plunger itself due to the action of the balls in the cam slots 17—17. If this occurs, usually it will free the valve so that further downward movement of the lever 12 will close the valve and seat the disks 3—3. If now the lever is moved downward still further, the plunger cannot be lowered substantially, but the balls acting in the cam grooves 17—17 will produce a rotative movement of the plunger around its own axis and while the plunger is seated. This will produce a certain amount of grinding action between the disks and their seats and will tend further to free any parts which may have been stuck initially due to any of the causes above mentioned. It is obvious that the lost motion connection between the valve plunger and one of the actuating elements therefor, such as the lever 12 of the cylinder 15, is essential to the production of the result just described.

Such rotary motion also has the effect of winding up the torsion spring 23 and storing power in it. Consequently, when the lever 12 is again raised to open the valve, the power so stored in the spring is released, and it tends immediately to revolve the disks just as soon as they are freed from their seats sufficiently to permit such rotation. This action also is assisted by the balls 18—18 working in their grooves. If there is any material resistance to upward movement of the valve, these two factors produce such rotative movement, even before the valve is unseated to any substantial degree. Further lifting of the lever will, however, raise the valve plunger. If it should stick hard, such movement might possibly be delayed until the balls reach the upper ends of the cam slots in which they work, but from that point on, movement of the lever would be positively transmitted to the valve plunger to raise it. The same is true when the lever 12 is moved in the opposite direction.

This rotative movement at the beginning of the opening movement of the valve and before the valve is unseated to any substantial degree is of value, also, in scraping foreign material off the seat and other parts engaging elements movable with the plunger and in keeping these parts in good operative condition. It should also be observed that during the time in which the valve disks are revolved in contact with their seats, the compressive action of the spiral spring 23 holds the disks yieldingly against their seats and thus facilitates the removal of scale, fiber, or other deposits from between the contacting surfaces.

In the particular construction shown in Fig. 1, the cam grooves are of such length that the valve plunger is rotated only through a quarter turn, or perhaps somewhat more. In some cases a much shorter turning movement than this is satisfactory. In others, however, it is preferable to produce a larger angular movement. The extent of amplitude of this movement can, of course, be varied to suit the requirements of particular conditions by suitably designing the cam.

Such an arrangement is illustrated in Fig. 2 in which the parts corresponding to those shown in Fig. 1 are designated by the same or primed numerals. Here, the spiral grooves 17'—17' are made considerably longer in angular extent, and the spring 23' is located inside the valve structure instead of between the telescoping elements 14' and 15'. In many situations, also, it is not necessary to use a torsion spring, although its use ordinarily is preferred.

It will be evident, also, that the cam grooves may be made in the cylinder instead of in the piston, the balls being carried by the latter member. Parts of such an arrangement are shown in Fig. 3.

The invention is likewise applicable to other type of valves, and a globe valve equipped with parts embodying this invention is illustrated in Fig. 4. Here, the valve plunger, including the stem 24 and the valve disk 25, is not secured directly to the screw-threaded valve stem 26, which is practically always found in valves of this type. Instead, the plunger carries a piston or drum 27 which telescopes within the cylinder 28 in the same manner that the parts 14 and 15 are arranged in Fig. 1. The piston is similarly grooved to receive balls mounted in the cylinder so that the same rotative movement of the disk 25 is produced while the disk is in contact with its seat, as in the constructions above described. Also, if desired, a spiral spring 30 may be interposed between the parts 27 and 28, in the same manner as in Fig. 1.

In this construction the raising and lowering movement of the valve plunger is produced by the rotation of the screw-threaded stem 26 and that fact is useful in producing what may be referred to as a "grinding in" action of the valve disk in its seat in connection with both the opening and closing movements of the valve.

For the reasons above described, valves embodying this invention clear themselves and remain in operative condition when otherwise their operation would be very unreliable or possibly prevented altogether. It is useful both in connection with automatic controls and also in hand operated valves, particularly where the latter tend to leak or, in other words, fail to shut off due to some such causes as those above described. Satisfactory operation is facilitated not only by keeping the valve seat and its cooperating disk in better condition, but also by the fact that the rotative movement of the plunger seems to facilitate the sliding movement of the stem through the stuffing box under conditions such that the straight line movement of the stem would be prevented merely under the influence of the limited power available in many automatic controls.

As above indicated, the torsion spring, together with a lost motion connection, may be utilized without the cam mechanism in some types of valves such, for example, as that shown in Fig. 4. Such an arrangement is illustrated in Fig. 5. Here the valve stem 26' is that of a hand operated valve, such as that shown in Fig. 4, and the valve plunger 32 carrying the disk 35 telescopes inside the stem. The two are connected by a torsion spring 33. As the stem 26' is rotated to seat the valve, the plunger revolves with it until after the disk 35 is in fairly firm contact with the seat 34, the spring 33 at this time acting as a compression spring as well as having torsional characteristics. During a part of this seating movement it is revolved in contact with the seat through the action of the spring. Later the resistance to rotation may become so great that such movement will be arrested and the further rotative movement of the stem will wind up the spring. The energy so stored in it is released when the valve is opened and produces a rotative movement of the disk 35 on its seat during the initial step of opening the valve.

While I have herein shown and described typical embodiments of my invention, it will be understood that the invention may be embodied in other forms without departing from the spirit or scope thereof.

Having thus described my invention, what I desire to claim as new is:

1. In a valve structure, the combination with a casing, a valve plunger and a seat for said plunger mounted in said casing, of operating means movable up and down for raising and lowering said plunger, and parts cooperating with said means to produce a rotary motion of said plunger around its own axis incidental to its movement toward and from its seat, said parts including a torsion spring in which energy is stored during an operating movement of said plunger in one direction and is released during such movement in the opposite direction.

2. In a valve structure, the combination with a casing, a valve plunger and a seat for said plunger mounted in said casing, of operating means for said plunger including a non-rotary reciprocating element operable to raise and lower the plunger, and a spiral cam cooperating with said element to utilize a portion of its movement in rotating the plunger around its own axis while in contact with its seat.

3. In a valve structure, the combination with a casing, a valve plunger and a seat for said plunger mounted in said casing, of operating means for said plunger including a non-rotary reciprocating element operable to raise and lower the plunger, a spiral torsion spring interposed between said element and said plunger, and means cooperating with said element to rotate the plunger against the action of said spring during a portion of the operative movement of said element and while the plunger is in contact with its seat.

4. In a valve structure, the combination with a casing, a valve plunger and a seat for said plunger mounted in said casing, of operating means for raising and lowering said plunger, comprising two elements telescoping one within the other, one of said elements being fastened to the plunger, means operable to raise and lower the other of said elements, a cam groove in one of said elements and a follower carried by the other and running in said groove, said parts being so shaped that the vertical movements of one of said elements relatively to the other will produce a rotative movement of said plunger.

5. A valve structure according to preceding claim 4, including a torsion spring associated with said plunger to be tensioned by said rotary motion and serving subsequently to rotate said plunger oppositely when the latter is freed for such rotation.

6. A valve structure according to preceding claim 4, in combination with a torsion spring encircling said plunger and arranged to be tensioned by the rotation of said plunger in one direction and serving to rotate said plunger in an opposite direction when the forces restraining such rotation are released.

7. In a valve structure, the combination with a valve casing, a valve plunger and a seat for said plunger mounted in said casing, of means for operating said plunger to open and close the valve including a non-rotary operating element, a portion of which is movable in a direction approximately parallel to the axis of the plunger to raise and lower the plunger from and toward its seat, and a cam structure connected with said element and operable to utilize a part of the operative movement of said portion of said element to rotate said plunger around its own axis while it is in contact with its seat.

8. In a valve structure, the combination with a valve casing, a valve plunger and a seat for said plunger mounted in said casing, of means for operating said plunger to open and close the valve including a non-rotary operating element, a portion of which is movable in a direction approximately parallel to the axis of the plunger, a cam structure including a member connected with said element to be moved thereby and a follower member connected with said plunger, said cam structure serving to utilize a portion of the operating movement of said element to rotate said follower and thereby to turn said plunger around its own axis while it is in contact with its seat, and means acting yieldingly through said cam structure in a direction tending to seat said plunger.

9. In a valve structure, the combination with a valve casing, a valve plunger and a seat for said plunger mounted in said casing, of means for operating said plunger to open and close the valve including a non-rotary operating element, a portion of which is movable in a direction approximately parallel to the axis of the plunger to raise and lower the plunger from and toward its seat, and a cam structure comprising two cooperating cam members serving to convert a portion of said operating movement of said element into a rotary movement, the cam member so rotated being connected with said plunger to rotate it and the other cam member being connected with said operating element to be actuated thereby.

10. In a valve structure, the combination with a valve casing, an upright valve plunger and a seat for said plunger mounted in said casing, of means for operating said plunger to open and close the valve comprising a lever, a spiral cam including a grooved element connected with said plunger and an operating element for said cam running in said groove and connected with said lever to be moved thereby, said parts being shaped so that the vertical movements of said lever will produce a rotative movement of said plunger, and means acting yieldingly on said plunger in a direction tending to hold it in its closed position, said cam elements also cooperating with said lever to transmit both opening and closing movements of the lever to the plunger.

11. In a valve structure, the combination with a casing, a valve plunger and a seat for said plunger mounted in said casing, of operating means for said plunger including a screw-threaded valve stem for raising and lowering the plunger, parts cooperating with said stem to rotate said plunger relatively to the stem and around the axis of the plunger incidental to such raising and lowering movement and while the plunger is in contact with its seat, the lower end of said valve stem having a telescoping connection with said plunger, and a spiral torsion spring also connecting said plunger with said stem.

ERNEST POIRIER.

CERTIFICATE OF CORRECTION.

Patent No. 2,289,931.                                          July 14, 1942.

ERNEST POIRIER.

It is hereby certified that error appears in the printed specification of the above numbered patent requiring correction as follows: Page 2, second column, line 73, claim 1, after "axis" insert --and relatively to said operating means--; and that the said Letters Patent should be read with this correction therein that the same may conform to the record of the case in the Patent Office.

Signed and sealed this 18th day of August, A. D. 1942.

Henry Van Arsdale, (Seal)                                   Acting Commissioner of Patents.